Figure 1:
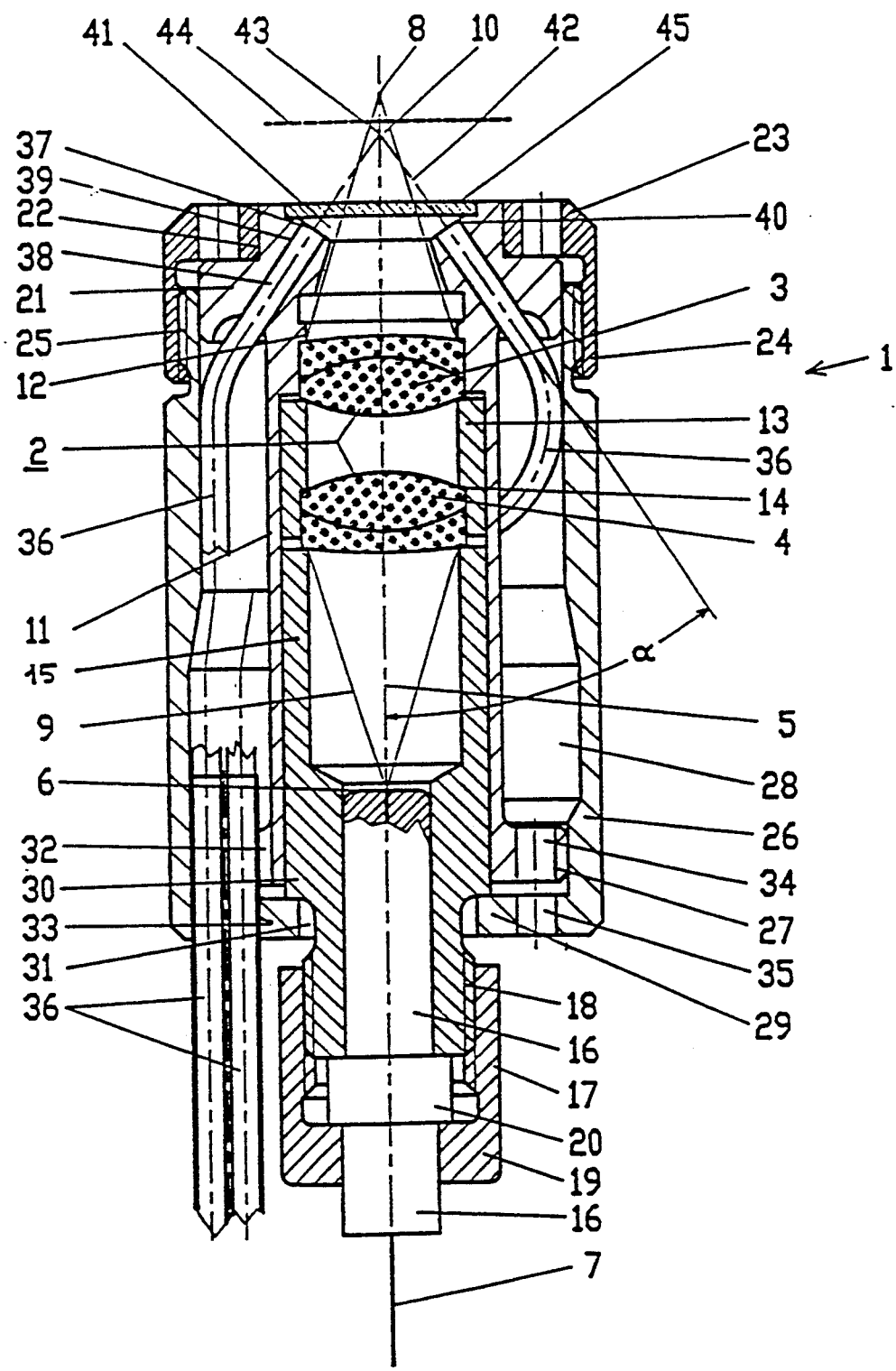

United States Patent [19]

Juffinger et al.

[11] Patent Number: 5,323,000

[45] Date of Patent: Jun. 21, 1994

[54] OPTICAL READ HEAD HAVING OPTICAL FIBERS INCLINED TOWARDS OPTICAL AXIS AND PROTRUDING PAST IMAGING OPTICS

[75] Inventors: Josef Juffinger, Thiersee; Andreas Als, Wörgl, both of Austria

[73] Assignee: Firma Schablonentechnik Kufstein Gesellschaft m.b.H., Kufstein, Austria

[21] Appl. No.: 26,821

[22] Filed: Mar. 5, 1993

[30] Foreign Application Priority Data

Mar. 11, 1992 [DE] Fed. Rep. of Germany ....... 4207774

[51] Int. Cl.$^5$ ................................................ G02B 5/14
[52] U.S. Cl. ................................. 250/227.13; 235/473
[58] Field of Search ..................... 250/227.11, 227.13, 250/227.26, 227.28, 566, 568; 235/462, 463, 472, 473; 385/115, 116

[56] References Cited

U.S. PATENT DOCUMENTS

| | | | |
|---|---|---|---|
| 3,182,291 | 5/1965 | Nassimbene | 250/227.13 |
| 3,809,893 | 5/1974 | Dobras . | |
| 3,868,514 | 2/1975 | Israelsson | 250/227.3 |
| 3,996,476 | 12/1976 | Lazzara | 250/227.28 |
| 4,143,809 | 3/1979 | Uebbing et al. | 235/472 |
| 4,264,127 | 4/1981 | Schumacher et al. . | |
| 4,639,837 | 1/1987 | Yokota | 385/115 |
| 4,799,751 | 1/1989 | Tekippe | 250/227.28 |
| 4,818,860 | 4/1989 | Hasegawa | 250/227.28 |
| 5,046,816 | 9/1991 | Lehmann et al. | 385/115 |
| 5,092,517 | 3/1992 | Monguzzi et al. | 250/227.28 |

FOREIGN PATENT DOCUMENTS

| | | |
|---|---|---|
| 0163114 | 12/1985 | European Pat. Off. . |
| 2628543 | 12/1977 | Fed. Rep. of Germany . |
| 3329375 | 5/1984 | Fed. Rep. of Germany . |
| 3423131 | 1/1986 | Fed. Rep. of Germany . |

Primary Examiner—David C. Nelms
Assistant Examiner—Stephone B. Allen

[57] ABSTRACT

An optical read head contains imaging optics for focusing incident light and light receiving optics arranged concentrically with respect to the imaging optics for receiving the light focused by the imaging optics and reflected from an object. The imaging optics and the light receiving optics are located on the same optical axis, the light receiving optics surrounding the imaging optics. The light receiving optics are also displaced forward in the direction of the incident light with respect to the imaging optics, an input face of the light receiving optics being inclined towards the optical axis. The optical read head is suitable for, among other things, the colour-selective scanning of material webs and other colour patterns and exhibits a high light receiving capability in addition to a high resolution capability.

13 Claims, 4 Drawing Sheets

OPTICAL READ HEAD HAVING OPTICAL FIBERS INCLINED TOWARDS OPTICAL AXIS AND PROTRUDING PAST IMAGING OPTICS

DESCRIPTION

The invention relates to an optical read head.

From DE3423131 A1, an arrangement for reading bar codes is already known in which light supplied via a single optical fibre is directed onto an object with the aid of a spherical lens. The light reflected from the object is focused by the spherical lens onto another single optical fibre and conducted back by the latter, this other single optical fibre extending along the optical axis of the read arrangement.

Furthermore, an optical sensor is known from DE3329375 A1, in which a first optical wave sensor receives light and conducts the light to a target zone whilst a second optical wave sensor receives an image reflected at the target zone, in order to transmit this image further.

The invention is based on the object of creating an optical read head which is capable of detecting as much as possible of the light reflected from the object.

An optical read head according to the invention is distinguished by the fact that the light receiving optics surround the imaging optics, the light receiving optics project past the imaging optics in the direction of the incident light, and an input area of the light receiving optics is inclined towards the optical axis.

According to the invention, the imaging optics located on the optical axis are surrounded concentrically by the light receiving optics so that light reflected from the object (for example reflected or scattered light) can be detected over a very large solid angle. The optical read head is therefore capable of conducting a high light flux to an optical detector which is connected to it at the output end. During the operation of the optical read head, the latter generally has a constant distance from the object to be scanned so that the light reflected from it can be detected over an even greater solid angle when the light receiving optics protrude past the imaging optics in the direction of the incident light. In such a case, the light receiving optics are therefore closer to the object than the imaging optics. If, in addition, the input area of the light receiving optics are inclined towards the optical axis, this again increases the solid angle at which the light reflected from the object can be detected so that the said measures provide an optical read head with high light receiving capability.

The imaging optics are preferably supplied with the incident light via an optical fibre which is connected at the input to a light source, for example to a Xenon high pressure lamp. The optical detector connected to the read head at the output end can have colour-selective properties so that it is possible also to scan an object provided with a colour pattern with true colours.

Such an object can be, for example, a fabric web, for example a web of textile material. When such a web of material is optically scanned, attention must be paid to the fact that the light incident thereupon is not completely absorbed in those areas which in each case come to lie between two moving threads of the material web. The scanning light spot must therefore not be too small. On the other hand, it is important to achieve high resolution capability in the optical scanning in the case of materials with a particularly fine weave so that the optical read head must be capable of cleanly focusing the scanning light supplied to it. For this purpose, the imaging optics preferably have achromatic lenses in order to fulfill the said task. During the optical scanning, the material web is then positioned at such a point between imaging optics and focal point at which the size of the scanning light spot at least approximately corresponds to the mesh size of the material web. Usual mesh sizes are within a range from 65 μm to 2 mm so that corresponding diameters for the scanning light spot must be adjustable by positioning the material web and the read head relative to one another.

In particular, however, the object to be scanned can also be a paper original with a smooth surface which carries a pattern designed by, for example, a designer, which is to be transferred into a computer. During the scanning of such a pattern, particularly small scanning light spots are needed which are also within a range of 65 μm diameter or less.

According to a very advantageous refinement of the invention, area normals standing in the centre of the input face of the light receiving optics intersect the optical axis at a point which is located in front of the focal point of the imaging optics on the object side. The point of intersection can be located at a distance from the focal point which is about 15 to 25 percent of the focal length of the imaging optics on the object side. The result is that, although the light receiving objects are not directly aligned with the respective scanning light spot, the greatest possible light flux is always obtained in the light receiving optics even in the optical scanning of objects having structures of different sizes, for example of material webs with different mesh size, that is to say when the objects or material webs are spaced at different distances from the imaging optics.

In accordance with an advantageous development of the invention, the light receiving optics consist of a multiplicity of optical fibres, the end faces of which are arranged around the imaging optics. The end faces of the optical fibres can be located directly adjacent to one another in order to detect as much light as possible which is reflected from the object.

On the one hand, it is possible to grind the ends of the optical fibres obliquely in order to incline the input faces thus obtained towards the optical axis when the optical fibres extend parallel to the latter. However, it is also possible to allow the optical fibres to extend towards the optical axis at an acute angle at their ends exhibiting the input faces so that the input faces can then lie perpendicularly with respect to the longitudinal direction of the optical fibres which can be implemented more easily in production.

It is advantageous to construct the light receiving optics with the aid of optical fibres since this provides the greatest possible design margin in designing the optical read head. In addition, optical fibres are available on the market which reduce the cost of constructing the light receiving optics.

According to another very advantageous embodiment of the invention, the ends of the optical fibres which exhibit the input faces are extended inward past the edge of the imaging optics by such an amount that they come to lie immediately adjacently to the cone of the focused light.

Such an arrangement of the ends of the optical fibres provides a high light flux in the light receiving optics particularly when the light impinging on the object to be scanned is essentially reflected in the direction of the imaging optics.

The optical read head according to the invention advantageously contains a hollow cylindrical carrier body which exhibits at its front end face an inwardly located conical surface from which through-holes extending in the direction of the normal to this conical surface extend for receiving the optical fibres.

This carrier body is used, on the one hand, for easily positioning the optical fibres in the area of the input face of the optical read head and, on the other hand, for positioning the imaging optics so that the light receiving optics and the imaging optics are accommodated in only a single component, which reduces the production costs of the optical read head and simplifies its assembly.

The through-holes in the carrier body open at their end facing away from the conical surface in an outside circumferential recess in the carrier body so that the optical fibres can be conducted around the carrier body in this circumferential recess and to an axial rear output opening. In other words, the circumferential recess forms a receiving space for the optical fibres in order to protect these against external influences. This circumferential recess is covered with the aid of an outer sleeve which accommodates the carrier body. The outer sleeve, however, not only has the protective function with respect to the optical fibres but is also used for pushing a hollow cylindrical pressure stamp by means of a rear circumferential flange into the interior of the carrier body when it is pulled with the aid of a collar element towards the front end of the optical read head which is supported on the carrier body. The hollow cylindrical pressure stamp locks the imaging optics within the carrier body.

The carrier body, outer sleeve, pressure stamp and collar element thus form a compact constructional unit so that a very robust optical read head is obtained.

Figure 2:
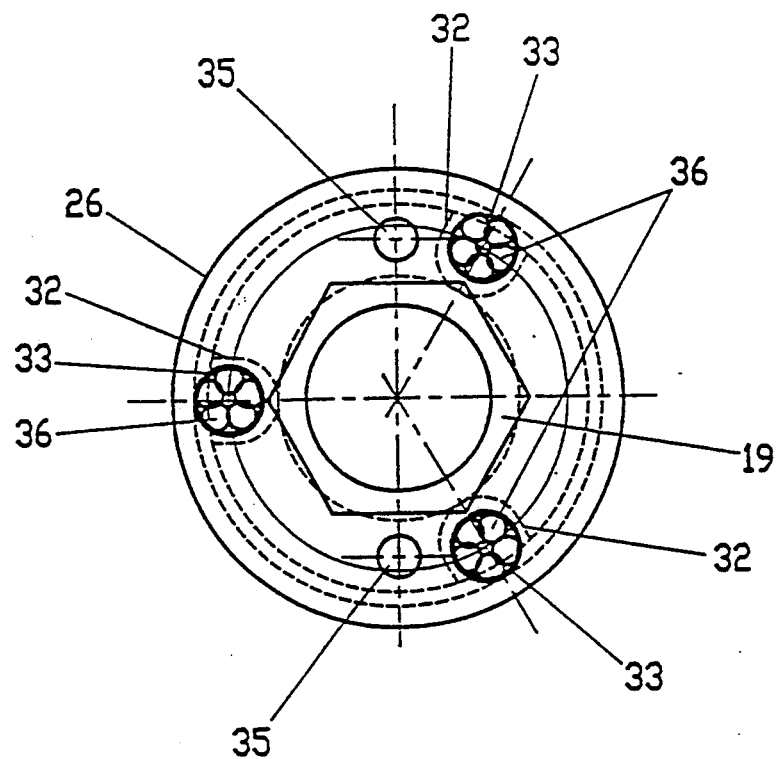
Figure 3:
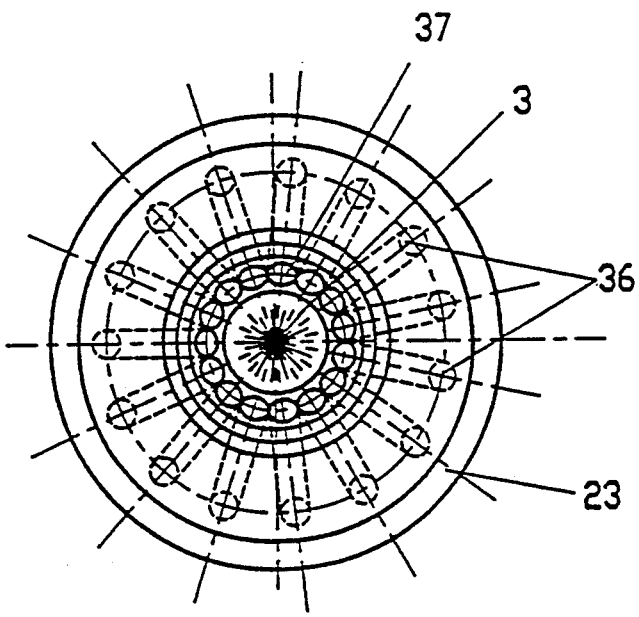
Figure 4:
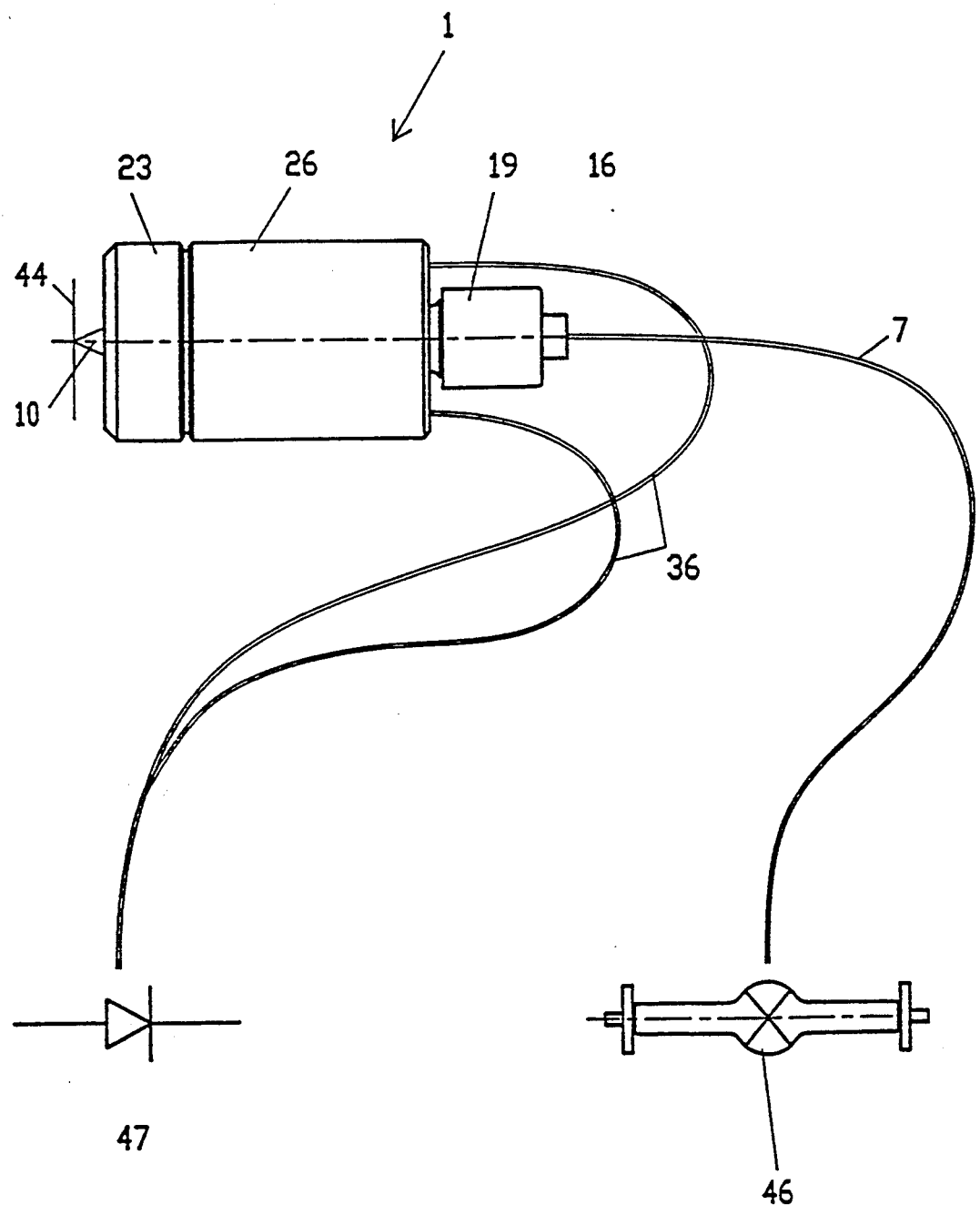
Figure 5:
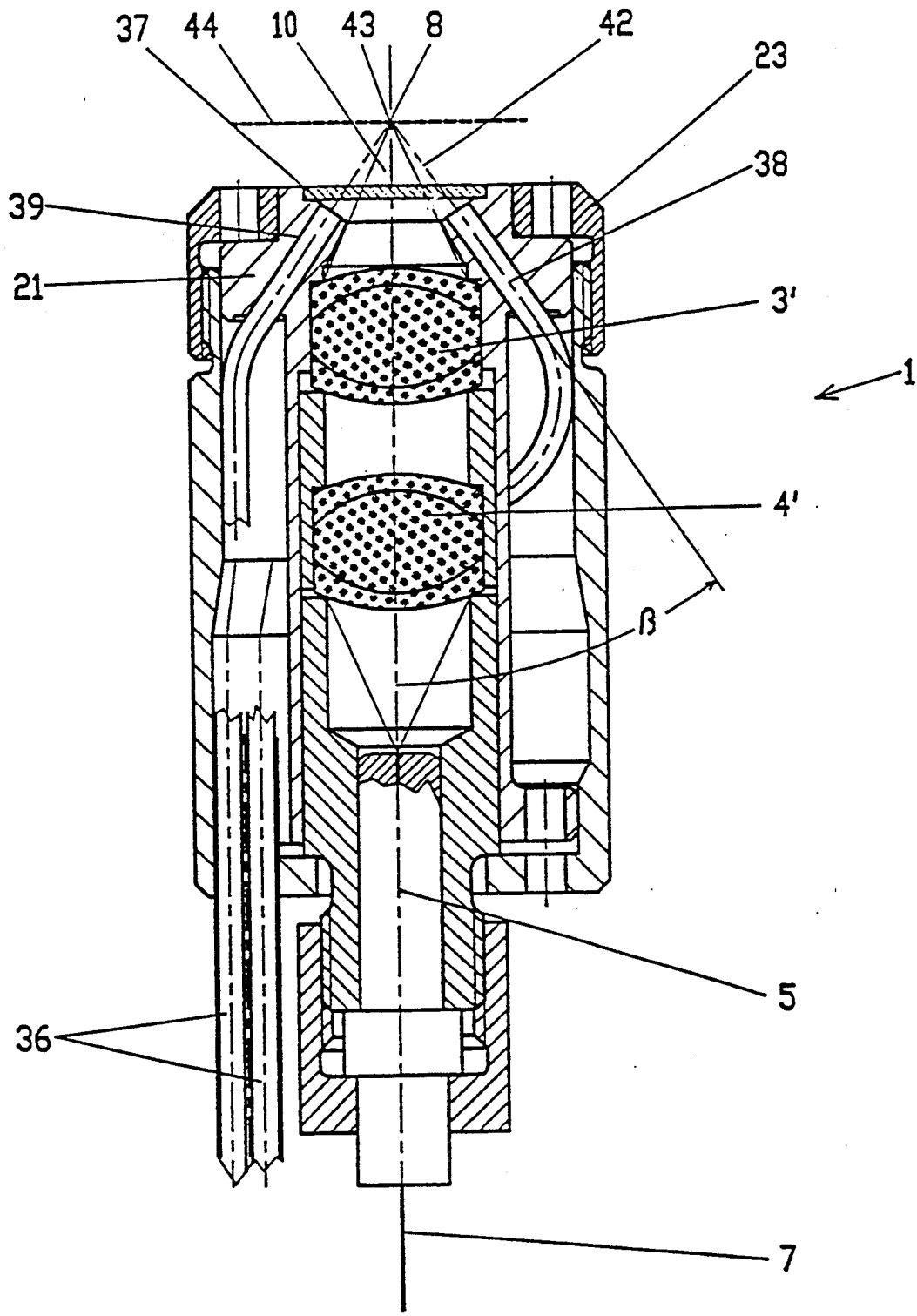

In the text which follows, the invention will be described in greater detail with reference to the drawings, in which:

FIG. 1 shows an axial section through an optical read head according to a first illustrative embodiment, FIG. 2 shows an axial view of the optical read head according to FIG. 1 from the bottom, FIG. 3 shows an axial view of the optical read head according to FIG. 1 from the top, FIG. 4 shows an optical scanning system with the optical read head shown in FIG. 1 and FIG. 5 shows an optical read head according to a second illustrative embodiment of the invention.

A first illustrative embodiment of an optical read head according to the invention will be described in greater detail in the text which follows, referring to FIGS. 1 to 3.

FIG. 1 shows an optical read head 1 which exhibits in its interior imaging optics 2 which consist of two achromatic lenses 3 and 4 which are arranged on an optical axis 5. The imaging optics 2 are used for focusing light emanating from an end face 6 of an optical fibre 7 in a focal point 8 located in front of the optical read head 1 and on the optical axis 5. For this purpose, a light cone 9 radiated from the end face 6 of the optical fibre 7 is converted by the achromatic lens 4 into a parallel light beam between the achromatic lenses 4 and 3 and then by the achromatic lens 3 into a projection light cone 10.

The imaging optics 2 are located inside a hollow cylindrical carrier body 11 which exhibits at its front end an inner circumferential step 12 on which the achromatic lens 3 comes to rest. A spacing sleeve 13 with an inner circumferential step 14 at its end facing away from the achromatic lens 3 for accommodating the achromatic lens 4 and a hollow cylindrical pressure stamp 15 are also inserted in the hollow cylindrical carrier body 11. If the hollow cylindrical pressure stamp 15 is pushed into the interior of the carrier body 11, it presses against the circumferential edge of the achromatic lens 4 and thus pushes the spacing sleeve 13 against the circumferential edge of the achromatic lens 3 so that a pressing of the imaging optics 2 is achieved in the interior of the carrier body 11. The optical axis 5, the cylindrical axis of the carrier body 11 and the cylindrical axis of the pressure stamp 15 correspond to one another in this arrangement.

A cylindrical optical fibre holder 16 is inserted to fit into the end of the hollow cylindrical pressure stamp 15 facing away from the imaging optics 2, the pressure stamp 15 carrying in the adjacent wall area 17 an outside thread 18 onto which a collar nut 19 can be screwed. The optical fibre holder 16, along the cylindrical axis of which the optical fibre 7 is permanently embedded, exhibits an outer circumferential flange 20 which is overlapped by the collar nut 19 in order to pull this circumferential flange 20 against the rear end of the pressure stamp 15 and thus to lock the optical fibre holder 16 in the pressure stamp 15. The distance between the end face of the cylindrical optical fibre holder 16, against which the end face of the optical fibre 7 comes to lie and the stop face of the circumferential flange 20 on the pressure stamp side is selected in such a manner that the end face 6 of the optical fibre 7 comes to lie in the focal point of the achromatic lens 4.

In the area of the achromatic lens 3, the carrier body 11 exhibits an outer circumferential flange 21 in the end face of which a circumferential step 22 is placed at the edge. The circumferential step 22 at the edge is used for accommodating a collar nut 23 which is supported on the circumferential flange 21. The collar nut 23 exhibits a circumferential wall 24, extending toward the rear end of the optical read head 1, with an inside thread 25, which can be screwed onto a corresponding outside thread of an outer sleeve 26 which, on the one hand, rests on the circumferential wall area of the outer circumferential flange 21 and, on the other hand, on the circumferential wall area of a further outer circumferential flange 27 which is located at the rear end of the carrier body 11 and is, for example, integrally joined to the latter. This provides a hollow space 28 extending around the carrier body 11, bounded by the circumferential flanges 21 and 27 in the axial direction and by the outer sleeve 26 towards the outside.

The outer sleeve 26 exhibits at its rear end a circumferential flange 29 pointing inward which engages behind a step 30 at the outer circumference of the hollow cylindrical pressure stamp 15. This step 30 is obtained by reducing the outside diameter of the pressure stamp 15 in this area so that it can be pushed with its section carrying the thread 18 through a central opening 31 which is formed by the circumferential flange 29.

If the collar nut 23 is rotated, it is supported, on the one hand, on the circumferential flange 21 and, on the other hand, pulls the outer sleeve 26 towards itself since it engages the latter via the thread 25. As a consequence of this axial movement of the outer sleeve 26, the circumferential flange 29 integrally joined to it pulls the pressure stamp 15 inwards since the circumferential flange 29 then engages behind the step 30. The resultant axial displacement of the pressure stamp 15 now leads to the previously mentioned pressing of the imaging optics 2.

Axial through-holes 32, 33, 34 and 35 which are aligned with one another can be present both in the circumferential flange 27 and in the circumferential flange 29. Optical fibres 36 of the light receiving optics, on the one hand, and mounting elements for mounting the optical read head 1 on a carrier, not shown, on the other hand, can be passed through these through-holes.

FIG. 2 shows a bottom view of the optical read head according to FIG. 1, there being a total of three through-holes for optical fibres 36, distributed at identical angular spacing, and two through-holes for mounting elements. The through-holes 32 in the circumferential flange 27 can also be constructed as radial recesses as is shown in FIG. 2.

In the text which follows, the light receiving optics of the optical read head 1 will be described in greater detail.

According to FIGS. 1 and 3, fifteen optical fibres 36 are passed through the openings 32 and 33 into the interior of the hollow space 28, the light input faces 37 of the optical fibres 36, that is to say their end faces at the front end, being arranged concentrically around the imaging optics 2 as is shown in FIG. 3. The light input faces 37 of the optical fibres 36 are located closely adjacently to one another so that there are no intermediate spaces between them.

The ends 38 of the optical fibres 36 are passed through through-holes 39 which are located in the upper circumferential flange 21 of the carrier body 11. The ends 38 are firmly inserted in the through-holes 39 which extend at identical angular spacings in the circumferential direction of the optical read head 1. The through-holes 39 open, on the one hand, in the conical surface 40 of a cone 41 on the inner circumferential wall area of the carrier body 11 at the point end and, on the other hand, into the hollow space 28. The material of the carrier body 11 is brought close to the projection light cone 10 in order to be able to provide the through-holes 39 as closely adjacent as possible to the projection light cone 10. An angle $\alpha$ between the optical axis 5 and the respective central axes 42 of the through-holes 39 is selected in such a manner that the central axes 42 intersect in a common point 43 on the optical axis 5 which is located between the focal point 8 and the achromatic lens 3 and preferably in the vicinity of the focal point 8. It is particularly advantageous if the distance between the point of intersection 43 and the focal point 8 is about 15 to 25 percent of the focal length of the imaging object 2 on the object side. The central axes 42 preferably have an angle $\alpha$ of 30 to 45 degrees relative to the optical axis 5, the end faces 37 protruding by about half the distance between the achromatic lens 3 and the object to be scanned past the achromatic lens 3.

The reference symbol 44 designates an object to be scanned in FIG. 1, for example a web of textile material, the colour pattern of which is to be detected and stored in a computer. The object 44 to be scanned and the optical read head 1 can be displaced relative to one another in the direction of the optical axis 5 in such a manner that the object 44 can be scanned by means of a scanning light spot of a desired size. The scanning light spot is obtained from the area of intersection of the object 44 with the projection light cone 10.

It should also be pointed out that the imaging optics 2 and the light input faces 37 of the optical fibres 36 can be covered by a flat glass pane 45 in order to protect against contamination and damage.

FIG. 4 shows an optical scanning system with an optical read head according to FIG. 1. Identical parts as in FIG. 1 are provided with the same reference symbols and will no be described again.

As can be seen, light passes from a light source 46 into the optical fibre 7 in order to be able to illuminate the object 44 to be scanned with this light. The light source 46 can be, for example, a Xenon high-pressure lamp or another suitable lamp.

The light output by the optical read head 1 via the optical fibres 36 passes through a photo detector arrangement 47 which has colour-selective properties, in order to be able to generate in this manner different signals for different colour components of the light received.

FIG. 5 shows another illustrative embodiment of an optical read head 1 according to the invention. Here, too, identical parts as in FIG. 1 are provided with the same reference symbols and will not be described again.

The optical read head according to FIG. 5 only differs from that according to FIG. 1 in that Steinheiler achromatic lenses 3', 4' are used in it for generating a short-focal-length image. The angle $\beta$ between the optical axis 5 and the central axes 42 of the holes 39 is also selected in such a manner that the point of intersection 43 of the central axes 42 comes to lie in the focal point 8. Using such a read head, particularly accurate scanning of even the finest fabric patterns is possible with, at the same time, a high light receiving capability of the read head.

We claim:

1. An optical read head, with imaging optics, exhibiting an optical axis, for focusing incident light, and with light receiving optics, arranged concentrically to the optical axis, for receiving the light focused by the imaging optics and reflected from an object characterized in that the light receiving optics surround the imaging optics, the light receiving optics protrude past the imaging optics in the direction of the incident light, and an input face of the light receiving optics is inclined towards the optical axis.

2. The optical read head according to claim 1, characterized in that the imaging optics are supplied with the incident light via an optical fiber.

3. The read head according to claim 1, characterized in that the imaging optics contain achromatic lenses.

4. The optical read head according to claim 1, characterized in that normals to the surface standing in the center of the input face of the light receiving optics intersect the optical axis at a point which is located in front of the focal point of the imaging optics on the object side.

5. The optical read head according to claim 4, characterized in that the distance between the point of intersection and the focal point is about 15 and 25 percent of the focal length of the imaging optics on the object side.

6. The optical read head according to claim 1, characterized in that the light receiving optics consist of a multiplicity of optical fibers.

7. The optical read head according to claim 6, characterized in that the optical fibers extend towards the optical axis at an acute angle at their ends exhibiting the input faces.

8. The optical read head according to claim 7, characterized in that the ends of the optical fibers exhibiting the input faces are extended inward past the edge of the imaging optics by such an amount that they come to lie immediately adjacent to the cone of the focused light.

9. The optical read head according to claim 5, characterized by a hollow cylindrical carrier body which comprises on a front end face an inwardly located conical surface from which through-holes extending in the direction of the normal to the conical surface extend for accommodating the optical fibers.

10. The optical read head according to claim 9, characterized in that the through-holes open at their end facing away from the conical surface in an outside circumferential recess in the carrier body.

11. The optical read head according to claim 10, characterized in that an outer circumferential flange with axial openings for passing through the optical fibers is present on a rear end face of the carrier body.

12. The optical read head according to claim 8, characterized in that an outer sleeve, accommodating the carrier body, can be tightened at its front end face by means of a collar element which is supported against the carrier body and exhibits at its rear end face an inwardly pointing circumferential flange over which a hollow cylindrical pressure stamp can be pushed into the interior of the carrier body.

13. The optical read head according to claim 12, characterized in that the inwardly pointing circumferential flange exhibits axial holes for passing through the optical fibers.

* * * * *